May 19, 1964   R. M. BRICK ETAL   3,133,517
METHOD OF FORMING CONTAINER BODIES AND PRODUCT THEREOF
Filed Sept. 16, 1959   3 Sheets-Sheet 1

INVENTORS
Robert M. Brick,
Ralph A. Larson,
Curtis E. Maier,
Emery I. Valyi,
BY Mason, Porter, Diller & Stewart,
ATTORNEYS May 19, 1964 R. M. BRICK ETAL 3,133,517
METHOD OF FORMING CONTAINER BODIES AND PRODUCT THEREOF
Filed Sept. 16, 1959 3 Sheets-Sheet 2
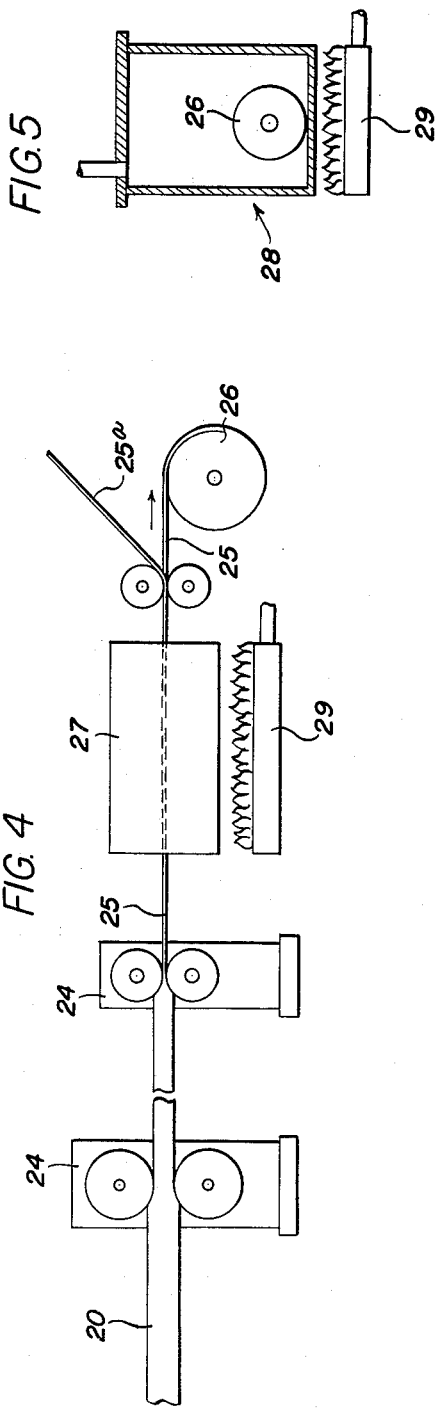
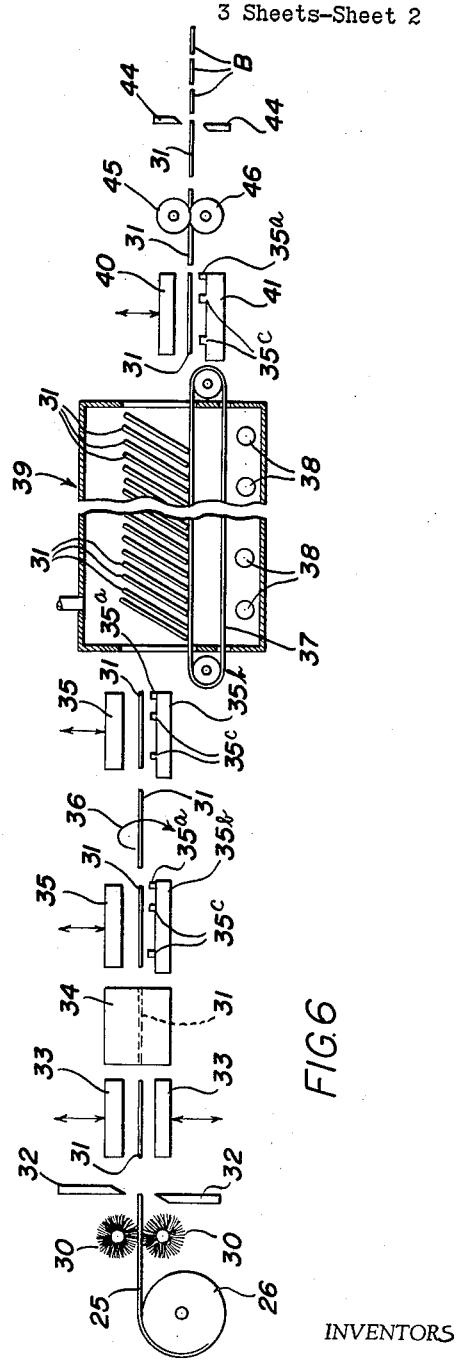
INVENTORS
Robert M. Brick,
Ralph A. Larson,
Curtis E. Maier,
Emery I. Valyi,
BY Mason, Porter, Diller & Stewart,
ATTORNEYS

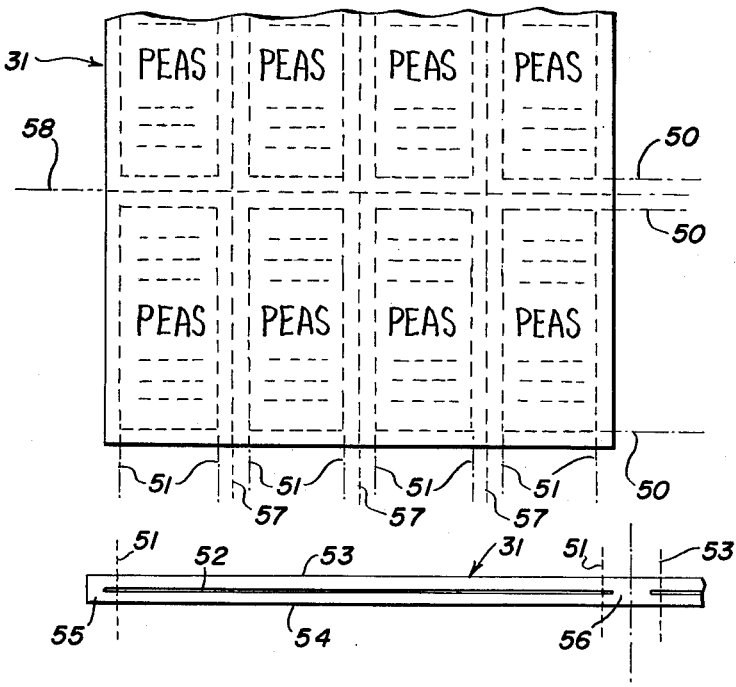
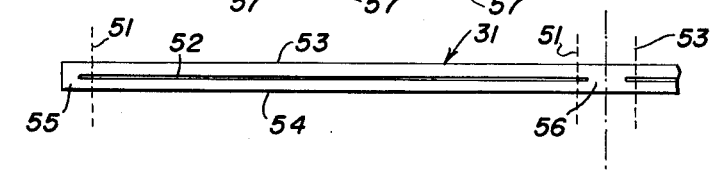
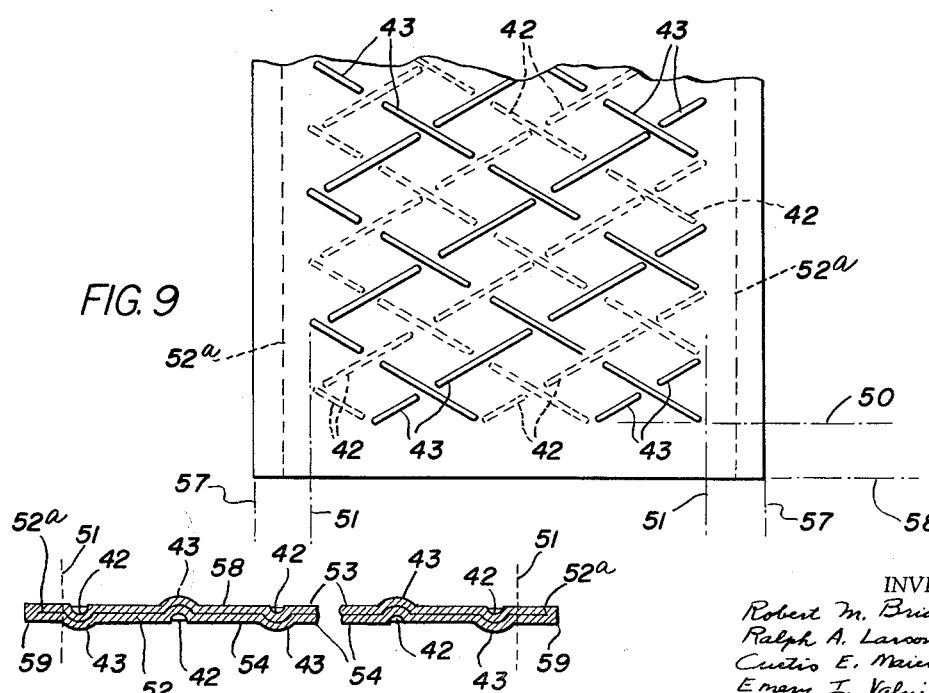

3,133,517
METHOD OF FORMING CONTAINER BODIES AND PRODUCT THEREOF
Robert M. Brick, Hinsdale, Ralph A. Larson, Chicago, and Curtis E. Maier, Riverside, Ill., and Emery I. Valyi, New York, N.Y., assignors to Continental Can Company, Inc., New York, N.Y., a corporation of New York
Filed Sept. 16, 1959, Ser. No. 840,404
4 Claims. (Cl. 113—120)

This invention relates to a method of forming container bodies and to the structures formed.

Metal containers are usually made from sheet or strip material such as steel black plate or tinned plate, by forming into cylindrical or other shape, and then joining the longitudinal edges at a body seam by soldering. In such work, it is feasible to apply decoration, such as labeling, by lithography upon the material before forming into shape but there are grave difficulties in lithographing upon the bodies after they are formed. Printing and baking equipment exist for such decoration operations upon material in flat sheets of sizes up to a maximum width and height for the specific equipment. Aluminum or aluminum surfaced material cannot readily be soldered; and container bodies thereof usually have body seams formed with adhesive sealing materials, which do not withstand internal pressures, or the body is formed at greater cost and at lesser production rates by drawing from a sheet blank, with inability to provide decoration easily to the outer surface.

It is known that container bodies can be produced by forming a billet with an internal region of anti-welding or resist material and other internal regions at which the billet material is integrally joined at the edges of such resist material; then extending the surface area of the billet while reducing its thickness to double that of the desired wall thickness and thereby forming a laminate structure having metal layers at each surface, with the thinned residue of the anti-welding material between the metal layers, these metal layers being integrally joined by metal at the edges; then cutting to size and opening the extended billet by entering it at the exposed end region of the non-welding material and spreading the metal layers of the reduced billet to form the container body while leaving outwardly projecting ribs at the sides; and then conforming these ribs to the body. Ends can then be applied to the body. Alternatively, the billet may be made with a number of such internal regions of non-welding material with intervening regions at which the billet is integral, whereby the extended billet is multi-wide, in that several blanks are present in the same across its width, and the laminate structure can be split between the non-welding regions to form strips and the strips opened out and formed into containers.

According to the present invention, the billet can be made, reduced, and cut into sections of multiple width and length, herein termed multi-wide and multi-long, because each section has two or more individual body blanks across its width and along its length: and such sections can then be decorated by existing printing and baking equipment; after such decoration, these sections are severed into individual decorated blanks which are then opened out into the desired body shape.

It has been found that the operations of opening or expanding, and of conforming the external fins to the body, requires that the metal be in a ductile condition so that cracks will not develop in the regions adjacent the fins and the lamination edges. That is, an annealing is required to dissipate the effects of work hardening: and this is normally effected at temperatures deleterious to lithography and surface enamels and inks.

Difficulty has been encountered in providing clean-cut adherent lithograph printings upon long lengths of rolled metal strip. In the making of metal containers, it is desirable that printings be present to identify the contents, its composition and source, and provide instructions as to use.

Further, the process described herein permits economical making of metal layers or laminations for the side walls of containers at very small thickness dimensions: and for stiffness of the container bodies it has been found that the presence of embossed patterns confers a desirably increased sectional modulus against bending or collapsing, e.g., upon blows against the side or incidental to the presence of contents under vacuum.

Illustrative practices of the invention are set out on the accompanying drawings, in which:

FIGURE 4 is a conventionalized view of an apparatus for rolling and treating the billet of FIGURE 1 and the strip formed therefrom;

FIGURE 5 is a conventionalized view of an annealing oven for coils of strip material;

FIGURE 6 is a similar conventionalized view of an apparatus for converting the strip of FIGURE 3 to individual container blanks;

FIGURE 7 is a plan view of a part of a multi-wide, multi-long section, with decoration thereon, at a scale larger than FIGURE 3;

FIGURE 8 is an end view of part of a single unembossed section, showing the relationship of decorated areas to the connections or spacers between the metal layers, on a greatly enlarged scale;

FIGURE 9 is a plan view of a part of a single blank, showing an embossed pattern thereon;

FIGURE 10 is a transverse sectional view, of the blank in FIGURE 9;

Figure 1:
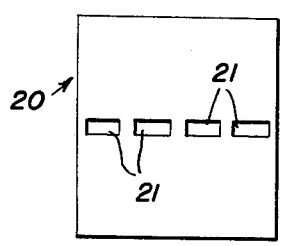
FIGURE 1 is an end elevation of a section of a billet for rolling into a multi-wide strip.

In the drawing, a mass 20 of metal, e.g., aluminum, is shown in FIGURE 1 as being integral and having internal regions 21 filled with anti-welding material, these regions being shown as located in a plane midway between the upper and lower surfaces of the mass. Such a mass can be prepared by casting the metal in an ingot mold in which core bars of coherent anti-welding material are supported; or by filling longitudinal passages in a metal mass with non-welding material; or by placing strips of anti-welding material upon one slab or in channels thereof, placing another slab thereon, and then welding at the abutting areas outside the stripped areas. Such procedures are indicated in the Valyi and Tour Patent No. 2,375,334; and need not be repeated in detail here. Such masses will hereinafter be termed "billets."

Figure 2:
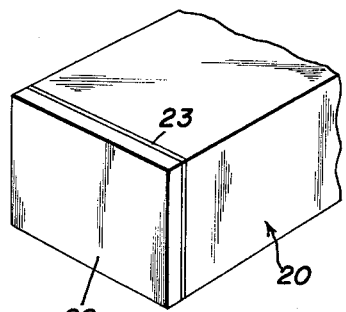
FIG. 2 is a perspective view, showing a closure of an end of such a billet preparatory to rolling.

Such billets can have the end which is intended to first enter the nip of the reducing rolls, or both ends, closed by end plates 22 (FIG. 2) of ductile material, e.g., of the analysis of the billets; which plates are secured by welded seams 23, and which serve to avoid excessive loss of anti-welding material.

Figure 3:
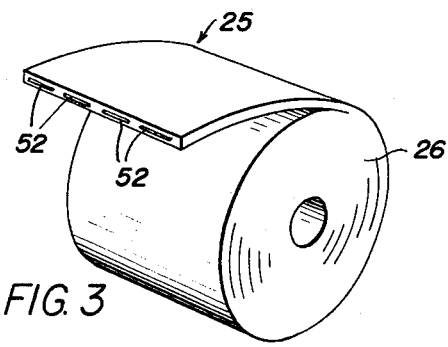
FIGURE 3 is a perspective view of a strip produced by rolling the billet of FIGURE 1.

The billet is then rolled in stands 24 to reduce its thickness and extend its length to form a strip 25, FIGURES 4 and 6, in which the total thickness between the upper and lower surfaces is essentially double the intended wall thickness of the container body. The anti-welding material therewith is likewise extended and reduced in thickness; and a very thin layer thereof is sufficient to prevent a weld being formed at the areas so protected, during rolling. The billet 20 may be extended to many times its original length. The strip 25 of material is shown in multiple width, that is, it has several regions 52 of residue of non-welding material 21, and hence is referred to herein as multi-wide, and is shown in FIGURE 3 as having four such regions 52 corresponding to the four regions 21 of the billet 20 in FIGURE 1. One or both edges of the strip as rolled may be trimmed to parallelism with the adjacent edge of the adjacent resist residue region 52, e.g., by removing the strip 25a; whereby to provide a reference edge so that transverse severance may be accurately angled relative to the resist residues, and so that a guide edge is provided for use during printing for accurately locating the printed design relative to boundaries of each unit blank. Therewith, it will be noted that the original width of the billet 20 is so selected that the width of the strip 25 therefrom is within one of the maximum dimensions of sheets which can be handled by the decorating equipment as described hereinafter. Preferably, the number of resist cores 21 is selected as the greatest which will provide a strip width competent of decoration.

This strip can then be wound into a coil 26. Prior to winding, a complete or partial heat treatment, for increasing the ductility of the material at the integral joints or spacers, may be given by heating to annealing or solution heat treating temperature, in the conventionalized device 27 with heating means 29, for offsetting the work hardening which has occurred during rolling. If only partial or no heat treatment is given before coiling, the coil 26 may be so treated in the oven 28, FIGURE 5, having a heater 29. The choice of heat treatment before or after coiling depends upon the extent of final cold rolling, the space allowable for a device 27, and like factors. The strip remains in the device 27 for the specified treatment time, e.g., to give each unit area a treatment at temperature for 2 to 5 minutes. When a device 27 is not employed, or is employed only for partial heat treatment, the coil is heat-treated in the oven 28; noting that the greater mass present requires a longer come-up time, as that the treatment may be for 30 minutes to 2 hours therein for completeness.

When the complete heat treatment is by the device 27 of FIGURE 4, the strip may be led directly to cleaning brush rolls 30, FIGURE 6. When the heat treatment includes coiling and use of the oven 28, FIGURE 5, the coil 26 is unwound and fed to such brush rolls 30. During the progress of the strip through the steps shown in FIGURE 6, it is converted to individual blanks for containers. The operations can include a cleaning by brush rolls 30, with a dressing of the surfaces with a lubricant, as is practiced with tin plate surfaces, so as to be receptive to base coat, inks, and varnishes used in decorating. The strip is then cut to sections 31 of proper size for the oven 39 in which the decoration is to be baked: such cutting may be done by a guillotine 32, with the strip being fed step-wise in known manner for the purpose, and with the severances occurring at right angles to the guide edge, FIGURE 3. The sections 31 are then given an all-over base coating at both sides, e.g., by the printing devices 33, and are dried in an oven 34. The sections are then printed; for example by a first printing plate 35, air-dried, turned over about a longitudinal axis as shown by the arrow 36, and printed on the opposite side by a second printing plate 35; noting that several printings may be employed for multi-color work. In the preferred practice, after the edge strip 25a has been removed to provide the reference edge for transverse severance, the sections 31 are fed to the printing platens 35b so that this edge is brought against edge stop pins 35a to locate the lamination areas properly as to width beneath the printing plates, that is, as to lines 51 in FIGURE 7; and against end stop pins 35c which located them as to length, that is, as to lines 50 in FIGURE 7. Therewith the turning at arrow 36 presents the reference edge for engagement by edge stop pins 35a of the next platen, with the same transverse severance edge coming against end stop pins 35c. During printing, the sections are aligned by the guide pins 35a, 35c on the platens 35b, which engage the guide edges of the section being printed, to assure registry. The air-dried sections are then racked in the baking oven 39 which has the usual racks for supporting the sections on edge, to economize space, these racks being on a conveyor 37 which advances the sections each as a flat sheet through the oven, where the baking is accomplished by hot air entering through the ducts 38.

Figure 11:
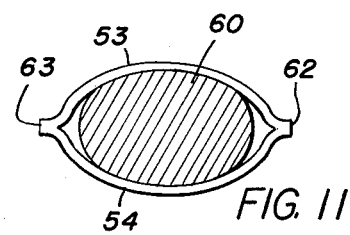
FIGURE 11 is a view, at substantially the scale of FIGURE 8, showing the partial opening of a blank.

After baking, the sections 31 appear as in FIGURE 7, and are passed to a press having die plates 40, 41 with ribs and grooves in each, in mating relation to grooves and ribs in the other, so that for example essentially identical contours are formed in the exposed surfaces; e.g., by producing alternate grooves 42 and ribs 43, FIGURE 10. Side and end stop pins 35a are employed as before, to locate the embossed areas relative to the reference line and the transverse severance line. Such pattern embossing serves for conferring a higher section modulus so that there is less deflection under a given pressure, e.g., when the container is employed for vacuum packing. Such embossing can be in diamond, oval, square or other pattern, a diamond form being illustrated with the face visible in FIGURE 9, being formed with outwardly extending rib portions 43 shown by full lines, and inwardly extending groove portions 42 shown by dash lines for distinctiveness: in FIGURE 9, the embossed pattern is co-extensive with the printed area defined by lines 50, 51 but it will be understood that this is not necessary. This embossing is particularly valuable with thin gauge aluminum walls, e.g., having thicknesses of 0.004 to 0.020 inch: and the embossing can be for examples of a depth of 0.002 to 0.050 inch, preferably within the range of from one-quarter to three times the body wall thickness depending on the gage. Both metal layers or laminations 53, 54 are embossed simultaneously, with grooves 42 and ribs 43 appearing at each surface, as shown in FIGURE 10. Such embossings terminate short of the fin areas and end flange areas between blanks, e.g., being limited to the portion of each blank defined by the lines 50, 51 in FIGURE 7; and therewith terminate short of the lateral edges 52a of the resist residue 52 in the blank, FIGURES 9 and 10, so that these edges remain as straight lines during opening as in FIGURES 11 and 12.

The section is then severed transversely and longitudinally to provide the individual decorated and embossed blanks: which is illustratively done (FIG. 6) by the slitting wheels 45, 46, and by the guillotine 44, and therewith the individual blanks B are obtained.

Figure 16:
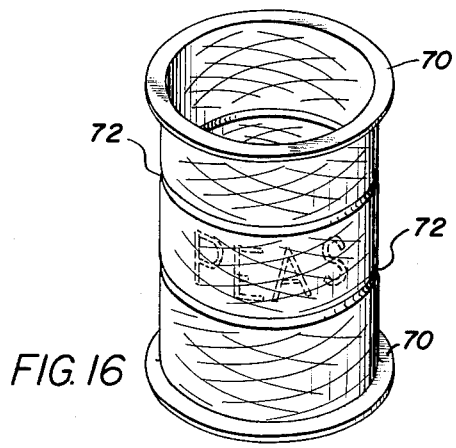
FIGURE 16 is a perspective view of a container body with end flanges, and with the embossing and decoration thereon.

Prior to embossing, each section 31 has the appearance as in FIGURE 7, which shows eight blank unit areas of a four-wide, multi-high section. Decoration can include a base coating and a design coating. The base coating can be applied over the entire area of the section, either as a single color or a transparent covering or as a pattern of several colors, for example, providing a background for the design. The design coating can be in several colors, e.g., with the name and picture of the contained product, the trademarking, instructions, and the like, in usual fashion for labels. It is preferred that the design coating should not extend to the severance lines, and it usually is to be terminated short of the edge of the resist residue. The lithographic printing of the design upon the base or background coat preferably is not extended over the entire areas of the sections, but it restricted to portions of each blank area, illustratively the rectangles bounded by the printing boundary lines 50, and traversing the regions 52, FIGURE 8, of resist or anti-welding material and the integral connections 55, 56 at the edges and at the intermediate longitudinal regions between the resist residues. As described below, the printing by the plates 35 may be confined also to areas of each blank defined by lines 51, that is the printing does not extend continuously over a section and across the connections 55, 56. The boundary lines 51, FIGURE 7, are opposite the resist regions 52, so that portions without design printing are left at the edges of the section and overlying and underlying the integral connections 55, 56 between the metal laminae 53, 54. The sections are later cut longitudinally along the lines 57 midway of the widths of the integral intermediate connections, and cut transversely at the lines 58 between adjacent boundary lines 50, with the lines 58 spaced apart for the specified blank dimension to give the container body height and its flanges, as shown in FIGURE 16.

FIGURE 7 shows the presence of printing within the individual blank areas defined by lines 50, 51.

In practice, the widths of the integral connections 56 can be kept at 1/16 to 1/2 inch, with the edges 55 at a like dimension. As is known in the rolling of thin strips of various metals, the billet does not extend regularly, even with great care in the rolling: for example, the edges are not straight lines, but the strip has curvatures from point to point known as "camber" which are usually trimmed away before coiling. When anti-welding or resist materials are present, as with the present invention, the residual layers of such materials also have like curvatures. In severing the strip into sections, care is taken to have an edge of the individual blank either parallel to and at a predetermined distance from an adjacent edge of a resist residue, or at right angles thereto, for serving as a guide during the lithographing, to obtain general registry of the printing with the individual blank areas. Therewith there may be variances in the distances of such printed areas from the longitudinal lines 57, FIGURE 7, as that upon severance along the lines 57, the printed areas may be closer to the line 57 at one edge of the blank than to the line 57 at the other edge, by 1/16 inch or less in practice. Therewith, if the integral spacers or connections 56, FIGURE 8, are made 5/16 inch wide, with a spacing of 7/16 inch between the lines 51 of adjacent blanks, the slitting between the blanks at uniform spacing of the slits will provide blanks having varying spacing between the printed area and the fin edge: but upon opening the body, trimming and conforming of the fins to the rest of the container body, this difference is not obvious to casual inspection, and there is no intrusion of the conformed fin upon a printed area.

Upon cutting the sections 31 to produce the individual blanks B, along the lines 57, 58, each of these blanks has decoration over central portions of its surface, but has undecorated margins where the fins will be formed. Each blank B has the metal laminae 53, 54 (FIGURES 8 and 10) integrally connected along the height of the container by integral portions 59, which may be the metal 55 at an edge, and a part of the metal 56 at an intermediate connection, or parts of two such intermediate connections, or parts of two such intermediate connections. By opening the body, and then trimming the fins to a lesser distance of projection, it is feasible to guide the trimming operation from adjacent internal surface portions of the body and attain uniformity.

Figure 12:
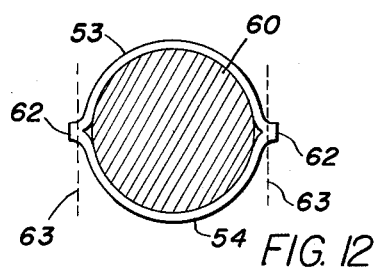
FIGURE 12 is a view, corresponding to FIGURE 11, showing the blank fully opened to circular cylindrical form, with the projecting fins.
Figure 13:
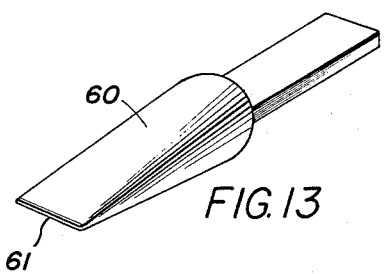
FIGURE 13 is a perspective view of a mandrel for opening the blank.

These metal laminae 53, 54 are then spread apart, e.g., by introducing a mandrel 60 (FIGURES 11–13) which has a thin front edge 61 (FIGURE 13), capable of entering at the layer 52 so that other portions of the wedge-shaped mandrel can spread the layers 53, 54 apart, wherewith the edge portions 59 move toward one another and form external fins 62. In practice, the stiffness of these fins aids the blank to open long its length, as shown by the successive shapings in FIGURES 11 and 12, until the final, illustratively circular cylindrical, form of FIGURE 12 is attained. The shaping of the blank proceeds by a reduction of the distance between the fins 62 which remain straight and essentially parallel during the opening operation, by bending of the laminae and essentially without stretching of the wall portions 53, 54 between the fins 62. The final opening operations may include employment of means for assuring concentricity of the projecting grooves and ribs with the circular general wall areas located between them. The fins 62 are formed from the longitudinal edges 59 of double thickness and project at diametrically opposite parts of the opened body, FIGURE 12; they may be trimmed as shown by the dotted lines 63, FIGURE 12. Inside the body, the parts of the wall portions 53, 54 at the former edges of the anti-welding or resist layer 52 remain at re-entrant angles 64 relative to one another: this angle increasing as the opening progresses.

The fins 62 preferably have a dimension from the point of the re-entrant angle to the external edge of the double-thick metal of the fin, of about 1½ to 2 times the thickness of the laminations 53, 54: which can be attained by trimming if necessary.

Figures 14, 15:
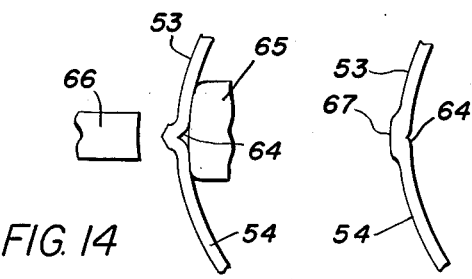
FIGURE 14 is an end elevation of a part of an opened body blank, at a scale larger than FIGURE 11, showing an operation being performed upon a fin to conform it to the body.
FIGURE 15 is a similar view showing the conformed section at the fin location.

The expanded body is then subjected to operations such as hammering or upsetting as it passes over an anvil 65, FIGURE 14, for the purpose of conforming the fins to the rest of the body formed from laminae 53 and 54. Therewith the fins are reduced to ribs 67, FIGURE 15, and the re-entrant angles 64 are caused to essentially disappear, leaving smooth inner and outer surfaces for the container.

The container body can then have end-seaming flanges 70 turned thereon, so that the body has the appearance, as in FIGURE 16, with its side walls having decorations thereon, and with the embossed pattern present to strengthen the walls. Beads 72 may be impressed in usual fashion, for further stiffening the body against distortion of cross-sectional shape. Internal spray coating with lacquer can be employed where desirable for the intended contents.

It will be understood that the illustrated practice of the invention is not restrictive, and that the same may be employed in many ways within the scope of the appended claims.

What is claimed is:

1. The method of making metal container bodies, which comprises preparing a metal billet having a plurality of internal discontinuities located substantially in a plane and containing anti-welding material, rolling the billet with said plane parallel to the roll axes to form a thin strip having a plurality of regions across its width each having surface laminations of metal separated by the residue of anti-welding material thereby forming internally opposed surfaces and exteriorly exposed surfaces and each having integral junctions at the longitudinal edges of such residue, heat treating the strip and thereby increasing the ductility thereof, embossing the laminated material at the regions of the surface laminations whereby to form ribs and grooves at each exteriorly exposed surface with the ribs at exteriorly exposed and internally opposed surface aligned with respective grooves at the other exteriorly exposed and internally opposed surface, without embossing at the regions between the said longitudinal edges, severing the embossed material longitudinally and transversely into container blanks each having surface laminations with resist residue therebetween and connected at each longitudinal edge by portions of said integral junctions, and forming a container body from a said blank by bending the laminations away from one another.

2. The method as in claim 1, in which the embossing is by forming ribs and grooves at each exteriorly exposed surface and extending diagonally relative to said severance lines, each rib on one exteriorly exposed surface being aligned with a groove at the other exteriorly exposed surface and a rib on the other interiorly opposed surface.

3. The method of making an externally decorated metal tubular body, which comprises preparing a metal billet having a plurality of internal discontinuities located substantially in a plane and containing an anti-welding material, rolling the billet with said plane parallel to the roll axes to form a thin strip having a plurality of regions across its width each having surface laminations of metal separated by the respective residue of the anti-welding material and having integral junctions at the longitudinal edges of such residue, removing an edge portion of the strip at the outer edge of the outermost integral junction along a longitudinal severance and reference line spaced from and parallel to the adjacent lateral edge of the adjacent said residue, severing the strip into sections which are in length a multiple of the lengths of the bodies to be made and along transverse lines at predetermined angles to said reference line, applying design decoration to a section while employing said reference line and the transverse severance edge as guides for locating the decoration on an outer surface of the respective laminations and upon areas thereof which terminate short of the positions of the lateral edges of the respective resist residue and short of the transverse severance edges, severing the section longitudinally along lines which are parallel to the said reference line and each located between two adjacent resist residues whereby to form body blanks, forming a said body blank into a tubular body by bending said laminations thereof away from one another while leaving externally projecting ribs constituted from the portions of said integral junctions and present between the resist residue and said longitudinal severance lines, and reducing the projection of said ribs into conformity with the tubular body at parts having no design decoration thereon.

4. The method of making a metal container body which comprises the steps of preparing a section of laminated material which has longitudinally extending metal surface laminations separated from one another for their major areas thereby forming internally opposed surfaces and exteriorly exposed surfaces and having integral junctions along longitudinal lines outside said areas, embossing the laminated material of the surface laminations whereby to form ribs and grooves at each exteriorly exposed surface with the ribs at an exteriorly exposed and internally opposed surface being aligned with respective grooves in other exteriorly exposed and internally opposed surfaces without embossing the integral junctions along the longitudinal lines outside said areas, and forming the container body by bending the laminations away from one another while leaving externally projecting fins constituted from said integral junctions.

References Cited in the file of this patent

UNITED STATES PATENTS

| | | |
|---|---|---|
| 29,276 | Holmes | July 24, 1860 |
| 1,176,912 | Lippmann | Mar. 28, 1916 |
| 2,063,013 | Cooper | Dec. 8, 1936 |
| 2,222,842 | Humphrey | Nov. 26, 1940 |
| 2,386,813 | O'Brien et al. | Oct. 16, 1945 |
| 2,444,463 | Nordquist | July 6, 1948 |
| 2,444,465 | Peters | July 6, 1948 |
| 2,690,002 | Grenell | Sept. 28, 1954 |
| 2,834,505 | Debs | May 13, 1958 |
| 2,881,516 | Hull et al. | Apr. 14, 1959 |
| 3,028,827 | Valyi | Apr. 10, 1962 |